United States Patent
Bruck et al.

(10) Patent No.: US 9,777,844 B2
(45) Date of Patent: *Oct. 3, 2017

(54) VALVE, IN PARTICULAR PILOT-OPERATED PROPORTIONAL DIRECTIONAL POPPET VALVE

(71) Applicant: Hydac Fluidtechnik GmbH, Sulzbach/Saar (DE)

(72) Inventors: Peter Bruck, Althornbach (DE); Markus Bill, Heusweiler (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 80 days.
This patent is subject to a terminal disclaimer.

(21) Appl. No.: 14/417,919

(22) PCT Filed: Jul. 18, 2013

(86) PCT No.: PCT/EP2013/002130
§ 371 (c)(1),
(2) Date: Jan. 28, 2015

(87) PCT Pub. No.: WO2014/019648
PCT Pub. Date: Feb. 6, 2014

(65) Prior Publication Data
US 2015/0260297 A1    Sep. 17, 2015

(30) Foreign Application Priority Data
Aug. 3, 2012 (DE) .................. 10 2012 015 356

(51) Int. Cl.
*F16K 31/00* (2006.01)
*F16K 1/52* (2006.01)
(Continued)

(52) U.S. Cl.
CPC ............ *F16K 1/526* (2013.01); *F15B 13/015* (2013.01); *F16K 31/408* (2013.01); *Y10T 137/7771* (2015.04)

(58) Field of Classification Search
CPC ...... F16K 1/526; F16K 31/408; F15B 13/015; Y10T 137/7771
(Continued)

(56) References Cited

U.S. PATENT DOCUMENTS 3,604,446 A * 9/1971 Brooks ................. F16K 17/105
137/115.03
4,746,093 A * 5/1988 Scanderbeg .......... F15B 13/015
251/282
(Continued)

FOREIGN PATENT DOCUMENTS

CH   671 080 A5    7/1989
DE   297 13 293 U1   10/1997
(Continued)

*Primary Examiner* — Umashankar Venkatesan
(74) *Attorney, Agent, or Firm* — Wenderoth, Lind & Ponack L.L.P.

(57) ABSTRACT

A valve, in particular a pilot-operated proportional directional poppet valve, has a valve housing (7) with a fluid inlet (21) and a fluid outlet (23). The fluid stream between the fluid inlet (21) and the fluid outlet (23) is adjustable by a main piston (27). A pilot valve chamber (37) provided on a rear face (29) of the main piston (27) has a pilot valve closing member (33) movable by an actuating device (69). By closing member (33) the fluid stream between the pilot valve chamber (37) and the fluid outlet (23) can be adjusted. An inlet aperture (3) is arranged between the fluid inlet (21) and the pilot valve chamber (37). A maximum volumetric flow controller (5) is in the main piston (27) in an outflow between the pilot valve chamber (37) and the fluid outlet (23).

21 Claims, 4 Drawing Sheets

(51) Int. Cl.
*F16K 31/40* (2006.01)
*F15B 13/01* (2006.01)

(58) Field of Classification Search
USPC ..... 137/115.03, 486, 115.09, 504; 251/30.04
See application file for complete search history.

(56) References Cited

U.S. PATENT DOCUMENTS

| | | | | |
|---|---|---|---|---|
| 6,886,802 B2 * | 5/2005 | Bartolacelli | .......... | F16K 31/408 |
| | | | | 251/129.15 |
| 2010/0294962 A1 * | 11/2010 | Bill | ........... | F16K 31/408 |
| | | | | 251/30.01 |

FOREIGN PATENT DOCUMENTS

| | | |
|---|---|---|
| DE | 197 55 120 A1 | 9/1998 |
| DE | 199 55 522 A1 | 5/2001 |
| DE | 101 02 409 A1 | 7/2002 |
| EP | 2 363 623 A1 | 9/2011 |
| WO | WO 02/14696 A2 | 2/2002 |

* cited by examiner

VALVE, IN PARTICULAR PILOT-OPERATED PROPORTIONAL DIRECTIONAL POPPET VALVE

FIELD OF THE INVENTION

The invention relates to a valve, in particular a pilot-operated proportional directional poppet valve, having a valve housing with a fluid inlet and a fluid outlet. A fluid stream between the fluid inlet and the fluid outlet is adjustable by a main piston. A pilot valve chamber provided on a rear face of the main piston has a pilot valve closing member movable by an actuating device such that the fluid stream between the pilot valve chamber and the fluid outlet can be adjusted. A supply aperture is disposed between the fluid inlet and the pilot valve chamber.

BACKGROUND OF THE INVENTION

In the case of fork-lift trucks, loads of load forks are often lowered in a proportional manner by poppet valves having a constant opening behavior. The poppet valves in this case can be directly actuated or can be pilot-operated. The use of poppet valves is necessary, in particular, because fork-lift truck manufacturers require a "stacker-tight" load behavior that allows for only very minimal leakage. By preventing leakage in the hydraulic circuit, the load fork cannot lower on its own with or without a load, which would pose a safety problem.

In the known solutions, a load-independent limitation of maximum volumetric flow is carried out by a constant volumetric flow controller connected in series to the other components of the hydraulic circuit. The requirement that a maximum lowering speed of a load fork cannot be exceeded, independently of the prevailing load pressure, is met in this manner. The known control devices associated therewith have the disadvantage that, when the load forks are lowered without a load, only the dead weight of the moving parts, in particular in the form of the load forks, is available at the lift mast for pumping the hydraulic fluid from the working cylinder (plunger cylinder) back to the tank as a component of the hydraulic circuit. In certain designs of lift masts, the pressure at the cylinder can fall to values <10 bar. The greater the number of components through which fluid must flow during lowering, the lesser the volumetric flow that sets in. In this connection, the known constant volumetric flow controller poses a particularly difficult obstacle to overcome, because the supply aperture thereof must be selected such that it is small enough that a control pressure differential of at least 7 bar can be established. Lesser control pressures would result in an unstable behavior in the hydraulic circuit of the working device and also cannot be accepted for reasons of safety. Moreover, small regulating pressure differentials also must not result in noticeable impairments of lowering speeds. The use of a maximum volumetric flow limiter also has the disadvantage that, when transitioning from the maximum volumetric flow limitation back to the proportional characteristic curve, a disadvantageous rebound occurs, which is manifested as a discontinuous movement of a load fork posing another possible safety problem. Finally, a flow controller that is connected in series causes a not inconsiderable loss in pressure, which pressure loss greatly slows the lowering of the load.

In addition, customers require a decreasing characteristic curve for the volumetric flow controller. For reasons of safety and practicality, the lowering speed must remain the same or slow down as the load increases. If this operation is carried out with the known control devices using the constant volumetric flow controller, this operation also results, in principle, in increased instability within the hydraulic circuit.

As an alternative to the solution having a maximum volumetric flow controller that is connected in series, the applicant has disclosed, in DE 101 02 409 A1, a control device in which a proportional directional poppet valve and a pressure regulator are connected in series in a hydraulic circuit. The users of these solutions now further require a valve that is even more cost-effective and requires less installation space.

SUMMARY OF THE INVENTION

The problem addressed by the invention is therefore providing an improved valve, in particular a pilot-operated proportional directional control valve, being substantially leakage-free, having lowering speed independent of the prevailing load pressure, operating without noticeable impairments of lowering speed at pressure differentials less than 10 bar, being low-effective and requiring little installation space.

This problem is solved by a valve, in particular a pilot-operated proportional directional poppet valve, with the central idea of the invention being the integration of a flow controller into the valve. According to the invention, a maximum volumetric flow controller is provided in the main piston in an outflow between the pilot valve chamber and the fluid outlet. The flow of the outflowing pilot fluid can be advantageously adjusted independently of the load by the maximum volumetric flow controller. In this manner, the pressure in the pilot valve chamber is increased such that the opening stroke of the main piston is reduced in a manner that is dependent on the load pressure. Therefore, the valve opens to a lesser extent in the presence of a high load pressure resulting, for example, from a high load on a load fork of a fork-lift truck. The lowering speed of the load fork is therefore advantageously reduced. By integrating the maximum volumetric flow controller into the main piston, practically no additional installation space is required. A considerable amount of installation space is therefore saved as compared to the solutions from the prior art that have downstream control elements.

The maximum volumetric flow controller preferably comprises a control piston, which is acted upon on a front face by pressure of the fluid flowing out of the pilot chamber and is acted upon on a rear face by a spring. In addition, the control piston can be acted upon on the rear face by the pressure in the spring chamber (this is the pressure that is reduced by the supply aperture). This design has the advantage that it requires only a minimum number of parts, which advantageously move in only one direction. Such a maximum volumetric flow controller is therefore easy to manufacture and adjust.

In addition, a fluid channel can be provided in the control piston, and control edges of the maximum volumetric flow controller can be formed in the control piston and in the main piston by bores. The size of the opening cross-section limited by the control edges is dependent on the position of the control piston. The throttle function of the maximum volumetric flow controller is therefore provided in a particularly simple manner.

Advantageously, the fluid channel has a lateral inlet opening on the control piston.

The control piston can be inserted into an axial bore of the main piston and, preferably, can be held in the axial bore by an end cap. This arrangement can be manufactured particularly efficiently and requires less installation space.

In a particularly preferred embodiment, the opening cross-section of the supply aperture can be reduced by a control element. The reduced cross-section of the supply aperture causes the pressure in the pilot valve chamber to drop. By this measure, the opening stroke of the main piston can be actively regulated in addition to the regulation at the pilot valve seat. The smaller the differential pressure is between the fluid inlet and the fluid outlet, the greater the extent to which the opening stroke of the valve can be adjusted. An additional flow-control function is therefore made possible.

Therefore, the opening stroke of the main piston can be made dependent on the differential pressure of the valve. The greater the differential pressure, the smaller the opening stroke of the valve that can be set. A flow-control function is therefore possible in which an inlet metering aperture can operate alone, without an additional flow-control edge. To ensure that the amount of pilot fluid specified by the constant flow controller can pass through the inlet metering aperture, an aperture cross-section must be opened with a size that varies according to the differential pressure. The load-dependent, variable opening cross-section of the inlet metering aperture is a prerequisite for a load-independent volumetric flow through the valve.

Due to this solution, an additional series-connected constant volumetric flow controller or a likewise series-connected pressure regulator is advantageously eliminated. As a result, production costs are reduced, and the amount of installation space required is substantially reduced.

Given that it is only the fluid that is passing through the pilot valve chamber that is regulated in terms of volumetric flow, instead of the entire fluid stream as is the case with the known solutions having a downstream volumetric flow controller or a pressure regulator, a smaller pressure loss, and therefore, greater efficiency are also obtained.

Preferably, the control element is assigned to the pilot valve closing member. For example, the control element can be designed as a radial projection on the pilot valve closing member. Therefore, the opening cross-section of the supply aperture can be changed by an axial or rotating movement of the pilot valve closing member. Providing a separate control device for the control element is then not necessary.

Particularly advantageously, the control element is designed as a collar on the pilot valve closing member. The collar has at least one pressure-relief bore. A collar is a circumferential projection or flange on the pilot valve closing member. This configuration has the advantage that the pilot valve closing member is additionally centered relative to the main piston, and the projection on the pilot valve closing member is always oriented toward the supply aperture. A plurality of pressure-relief bores, which are disposed so as to be distributed over the circumference, can also be provided.

In a particularly advantageous embodiment, the supply aperture comprises a plurality of aperture bores. The opening cross-section of at least one aperture bore can be reduced by the control element. By splitting the supply aperture into a plurality of aperture bores, the supply aperture can be very easily controlled in a plurality of opening stages. In addition, the aperture bores preferably have the same diameter. The aperture bores can also have different diameters to additionally adapt the control behavior of the valve to the different prevailing load pressures and to provide the adjustment with a characteristic that deviates from linearity.

The aperture bores are conveniently disposed in the main piston so as to be offset relative to one another axially and/or over the circumference. This arrangement of the aperture bores also simplifies the reduction of the opening cross section by the pilot valve closing member. By the axial displacement of the pilot valve closing member relative to the main piston, one or more aperture bores that are located one behind the other in the axial direction can be closed. In addition, aperture bores that are distributed over the circumference are easier to produce since the aperture bores have sections having different diameters. Therefore, overlapping aperture bores or weaknesses in the wall of the main piston caused by a plurality of concentrically disposed aperture bores can be avoided.

An aperture slot is conveniently provided between the fluid inlet and the supply aperture, which is preferably designed in the form of an annular gap between the valve housing and the main valve piston. The aperture slot has a filtration function and is intended to prevent particles in the fluid from entering the downstream units of the pilot valve. These particles can result in obstructions of the pilot valve, and therefore, in the failure of the valve as a whole.

Advantageously, the main piston is acted on, via the pilot valve closing member, by a spring when in a closed position. This arrangement ensures that the valve is largely leakage-free in the neutral position, thereby ensuring that a load fork does not lower, for example, during a relatively long standstill time. In addition, when the pilot fluid stream onto the rear face of the control piston is interrupted, the load pressure acts at the fluid inlet, whereby the closing force of the main piston is increased, and a very good sealing effect between the fluid inlet and the fluid outlet is achieved.

The pilot valve closing member can be drawn away from a pilot valve seat by the actuating device. The pulling design of the actuating device is also advantageous in light of the aforementioned safety aspect.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
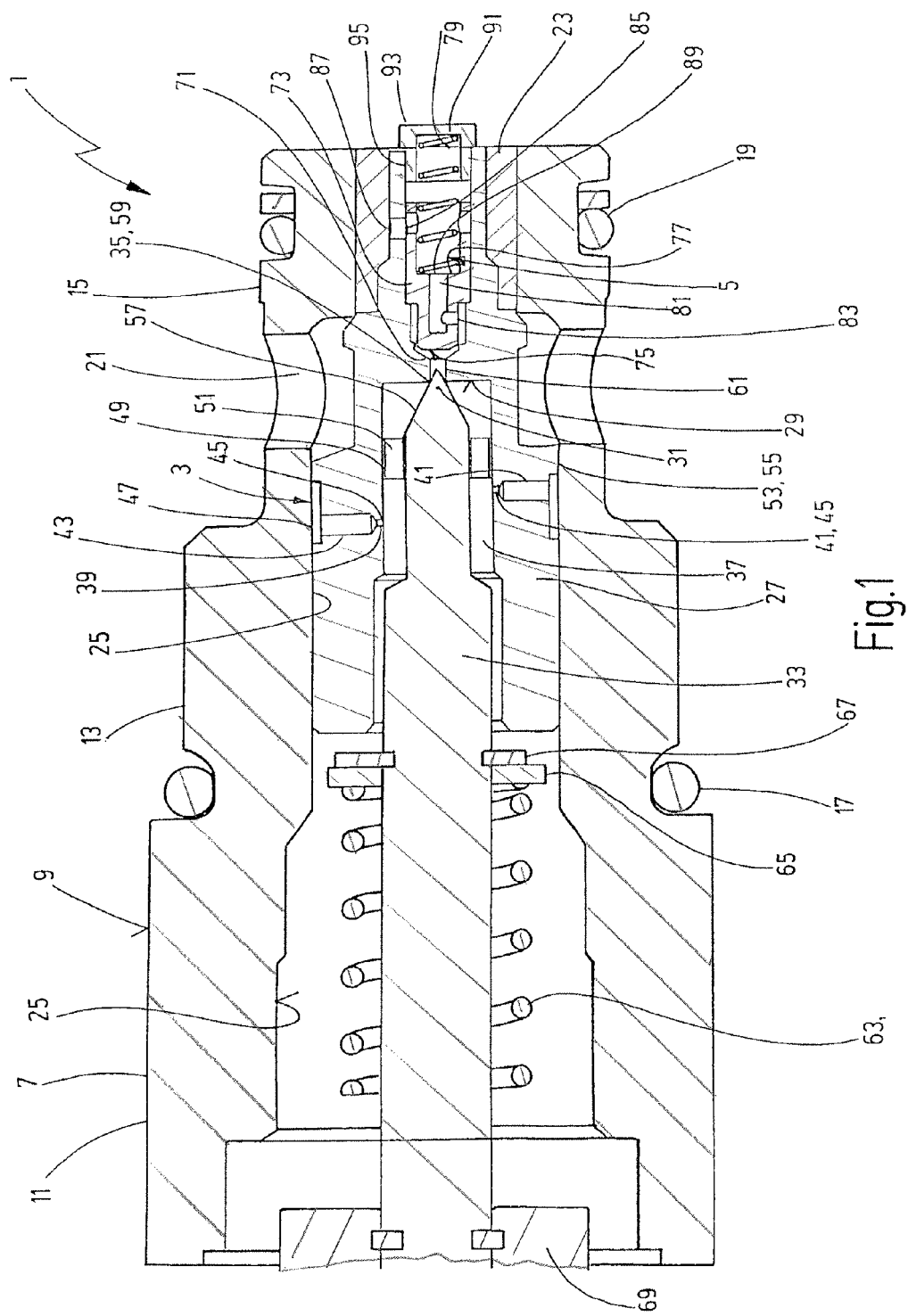
FIGS. 1 to 3 are side views in section of a valve according to an exemplary embodiment of the invention in three switching states, with FIG. 1, showing the valve in the closed neutral position, with FIG. 2 showing the valve in a working position with a low prevailing load pressure, and FIG. 3 showing the valve in a working position with a high prevailing load pressure, in which the opening stroke of the main piston is adjusted, i.e., reduced.
Figure 2:
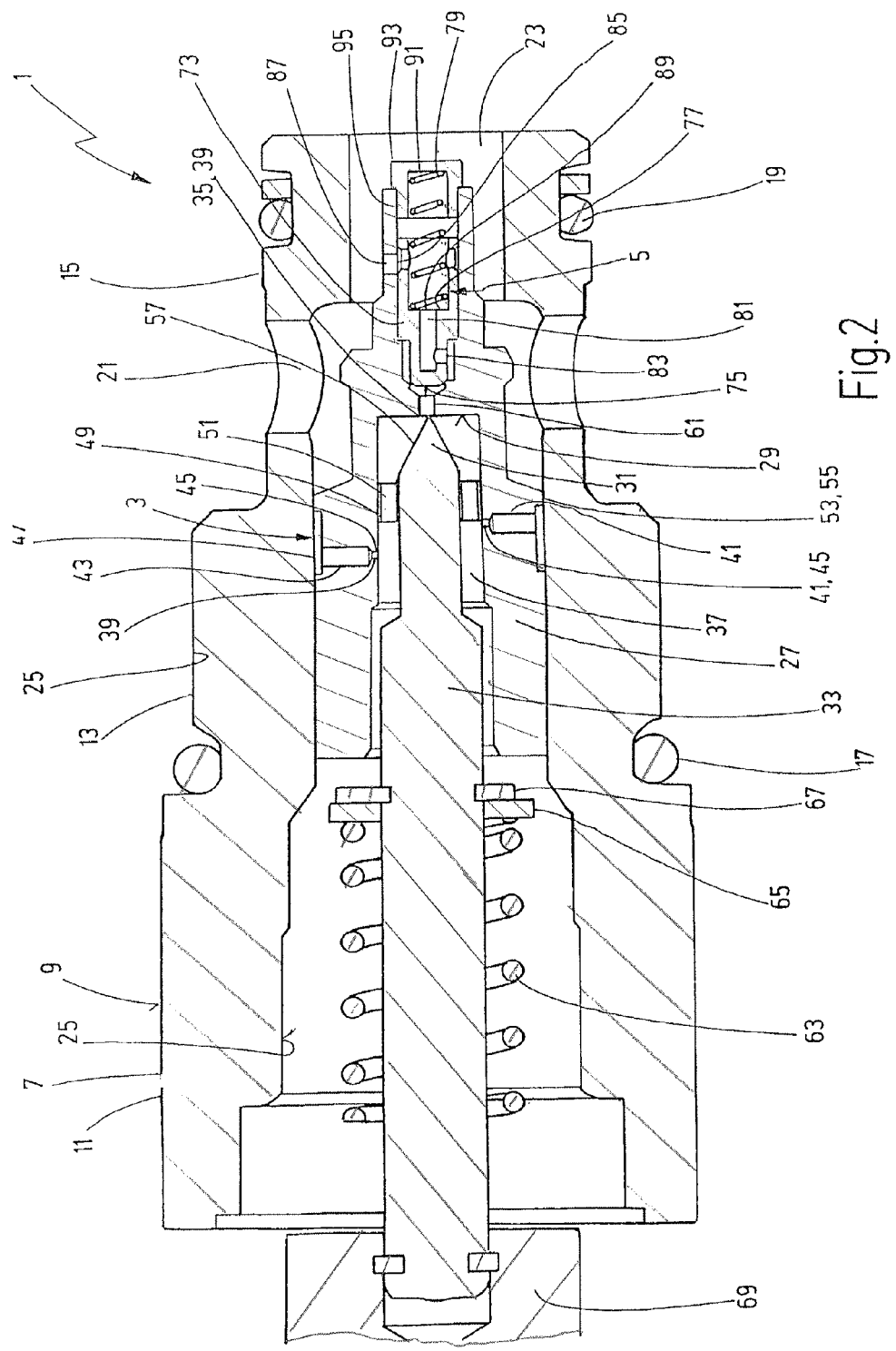
Figure 3:
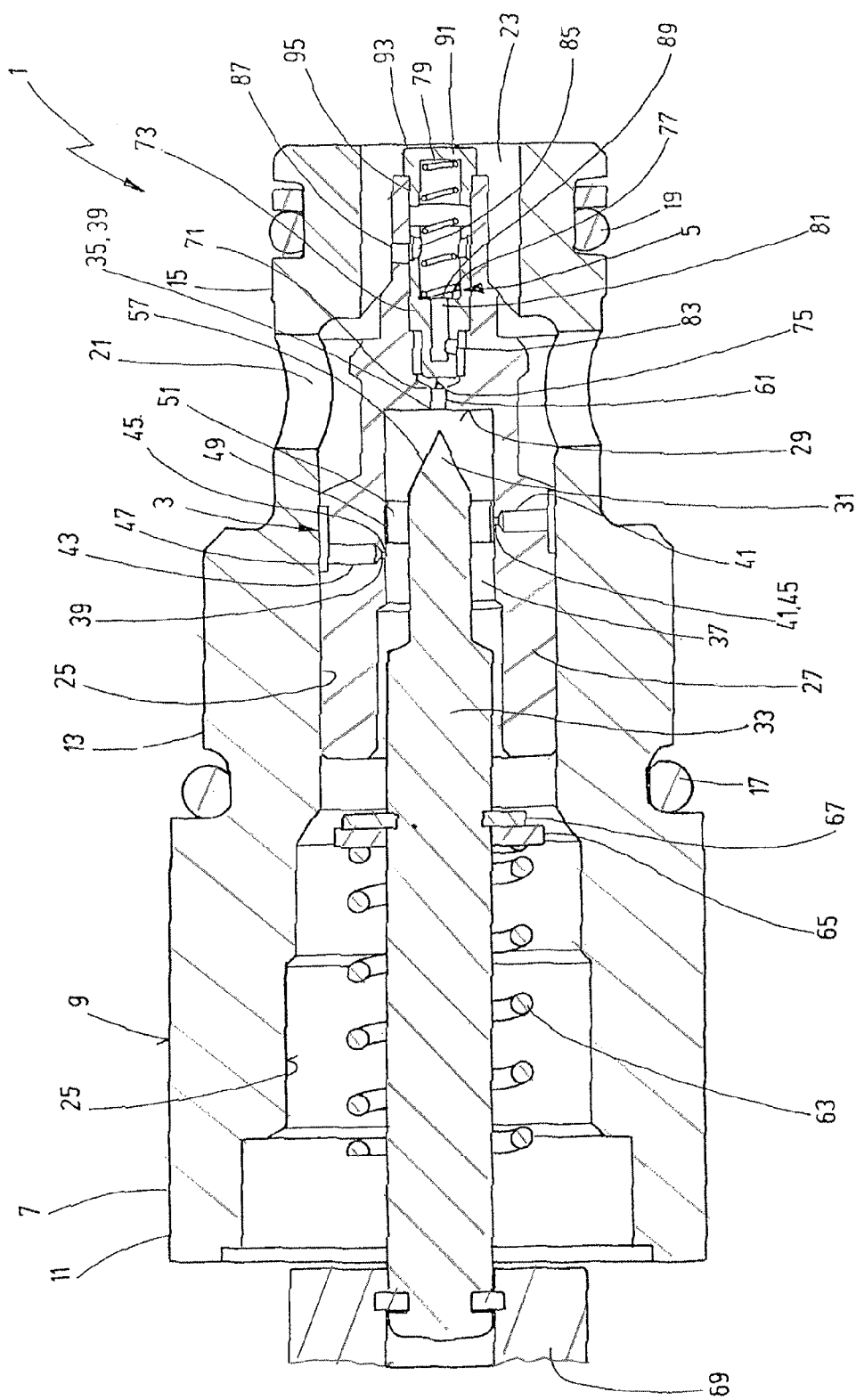

In FIGS. 1 to 3, the valve 1 is designed as a pilot-operated proportional directional valve having a cartridge design. The design is based on a conventional proportional directional poppet valve, into which a reducible supply aperture 3 and a maximum volumetric flow controller 5 have been integrated.

The valve 1 can be inserted into a valve block, which is not depicted in greater detail. To this end, the valve housing 7 is designed to taper in steps on the circumferential side 9. The individual steps are designed as a hexagonal step 11, a threaded step 13, and a simple step 15, and are sealed by circumferential annular seals 17, 19. The valve housing 7 comprises a lateral fluid inlet 21 and a fluid outlet 23 at the base. A main piston 27 is inserted into an axial bore 25 of the valve housing 7. The fluid stream between the fluid inlet 21 and the fluid outlet 23 can be regulated by the main piston 27.

A pilot valve 31 is provided on a rear face 29 of the main piston 27. The pilot valve 31 comprises a pilot valve closing member 33, which interacts with a pilot valve seat 35 in the main piston 27.

The supply aperture 3 is provided in the main piston 27 to limit the supply of pilot fluid to the pilot valve chamber 37. The supply aperture 3 comprises a plurality of aperture bores 39, 41. Each aperture bore 39, 41 comprises two sections 43, 45. In one radially outer section 43, the diameter of the aperture bores 39, 41 is larger than in an inner section 45. The aperture bores 39, 41 are disposed in the main piston 27 to be offset axially and over the circumference. All aperture bores 39, 41 are uniformly supplied with pilot fluid via a circumferential groove 47 of the main piston 27. To reduce the opening cross section of the supply aperture 3, a control element 49 in the form of a collar is provided on the pilot valve closing member 33. By the closing member 33, the aperture bores 39, 41 can be reduced or closed entirely depending on the axial position of the pilot valve closing member 33 relative to the main piston 27. The further the pilot valve closing member 33 is drawn out of the main piston 27, the greater the extent to which the opening cross-section of the supply aperture 3 is reduced. The collar 49 comprises pressure-relief bores 51 which are distributed over the circumference. By this design, the control behavior of the pilot valve closing member 33 is not noticeably changed by the collar 49. The supply aperture 3 can be provided in the proximity of, or at a relatively great axial distance from, the pilot valve seat 35. If the supply aperture 3 is disposed sufficiently close to the pilot valve seat 35, the adjustment regions of the pilot valve 31 and the control of the opening cross-section of the inlet aperture 3 overlap. Given a sufficiently large separation, the pilot valve closing member 33 must initially move so far away from the pilot valve seat 35 that the pilot valve seat 35 is completely opened before the opening cross-section of the supply aperture 3 is reduced.

In addition, an aperture slot 53 is assigned to the supply aperture 3. The aperture slot 53 is located between the fluid inlet 21 and the supply aperture 3 and is formed by an annular gap 55 between the main piston 27 and the valve housing 7. The aperture slot 53 has a filtration function. It is intended to prevent relatively large particles in the fluid from entering and obstructing the pilot valve 31. This obstructing would invariably result in a failure of the valve 1.

The pilot valve closing member 33 has a pointed cone 57 and interacts with the pilot valve seat 35, which is matched thereto, at one end 59 of an axial bore 61 of the main piston 27. The pilot valve closing member 33 is acted upon by a stiff spring 63, which is supported on the pilot valve closing member 33 via a disk 65 and a snap ring 67. When an actuating device or actuator 69 is inactive, the valve 1 is therefore preloaded into the blocking position (FIG. 1).

The actuating device 69 is designed as a pulling actuating device 69 to draw the pilot valve closing member 33 away from the pilot valve seat 35 when current flows through the actuating device.

The maximum volumetric flow controller 5 is located in the main piston 27 downstream of the pilot valve seat 35. The maximum volumetric flow controller 5 is disposed in an outflow 71 between the pilot chamber 37 and the fluid outlet 23. The maximum volumetric flow controller 5 comprises a control piston 73, which is acted upon on the front face 75 by the pilot fluid stream and which is acted upon in the opposite direction on the rear face 77 by a spring 79. The control piston 73 comprises a fluid channel 81 having a lateral inlet opening 83 that functions as a metering aperture. The pilot fluid can enter the control piston 73 and flow into the fluid outlet 23 through radial bores 85, 87 in the control piston 73 and in the main piston 27. Those bores 85, 87 form a control aperture. The metering aperture has a flow-control function. Depending on the opening position of the control aperture, which is formed by the bores 85, 87, the rear face 77 of the control piston 73 is acted upon by pressure that is reduced by the control aperture. The bores 85, 87 in the control piston 73 and the main piston 27 thereby form control edges of the maximum volumetric flow controller 5, which limit the opening cross-section depending on the position of the control piston 73. The spring 79 is positioned between a recess 89 of the control piston 73 and a recess 91 of an end cap 93, which is fastened in the main piston 27. To keep the design as simple as possible, the control piston 73 is inserted into the axial bore 61 of the main piston 27. The end cap 93 is screwed into an internal thread 95 of the axial bore 61 or is held in a clamped manner in the axial bore 61.

In addition, an adjustable maximum limitation of the opening stroke of the main piston 27 is provided. By a mechanically adjustable maximum stroke limitation on the actuating device 69, the maximum volumetric flow of the valve 1 can be mechanically adjusted independently of the magnetic force of the actuating device 69.

Figure 4:
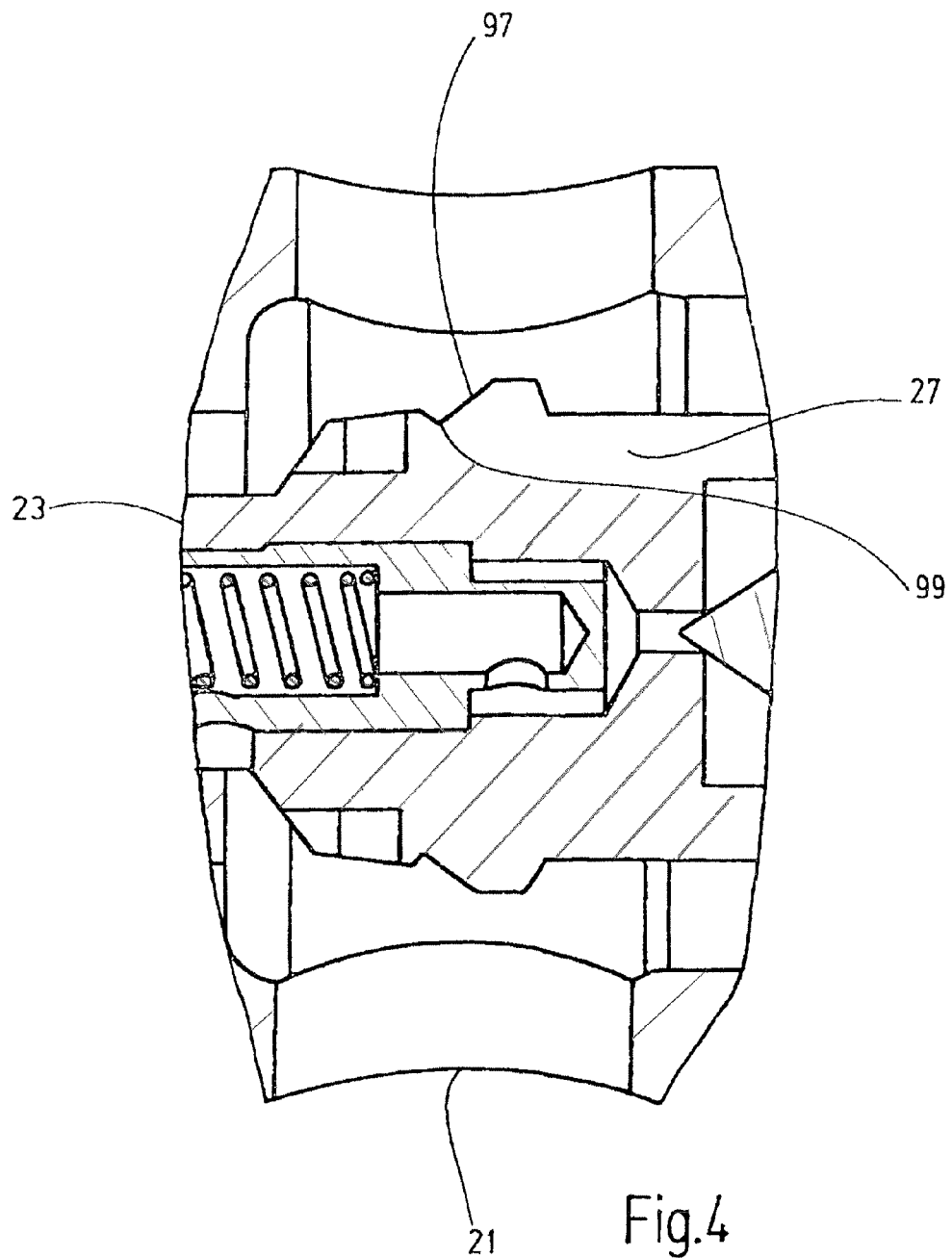
FIG. 4 is a partial side view in section of the main piston of FIG. 1 in the region of the fluid inlet.

A section of the main piston 27 in the region of the fluid inlet 21 is shown in FIG. 4. The main piston 27 is provided with a circumferential constriction 99 directly adjacent to a conical main valve surface 97 in the direction of the fluid outlet 23. The constriction has a V-shaped design.

A valve 1 has an opening stroke that is dependent on the actuating device 69 and on the load pressure prevailing at the fluid inlet 21. The effect of a high load pressure is that the opening stroke is reduced. If the load pressure is too low, the opening stroke can be increased by enlarging the supply aperture 3. The requirements for a leakage-free valve 1, which ensures a uniform volumetric flow even in the presence of a low pressure differential and which is independent of the prevailing load pressure, are therefore met.

Due to the integration of the volumetric flow control, the solution according to the invention also requires less installation space than the known solutions, in which a maximum volumetric flow controller or a pressure regulator is disposed downstream of conventional proportional directional poppet valve. Finally, this valve can also be produced at lower cost.

While one embodiment has been chosen to illustrate the invention, it will be understood by those skilled in the art that various changes and modifications can be made therein without departing from the scope of the invention as defined in the claims.

The invention claimed is:

1. A valve, comprising:
   a valve housing having a fluid inlet and a fluid outlet;

a main piston movable in said valve housing to adjust fluid flow between said fluid inlet and said fluid outlet;
a pilot valve chamber on a rear face of said main piston;
a pilot valve closing member being coupled to and actuated by an actuator and being movable in said valve housing to adjust fluid flow between said pilot valve chamber and said fluid outlet;
a supply aperture located between said fluid inlet and said pilot valve chamber; and
a maximum volumetric flow controller in providing fluid communication in an outflow direction between said pilot valve chamber and said fluid outlet, said maximum volumetric flow controller regulating a maximum flow from said pilot valve chamber to said fluid outlet, parts of said maximum volumetric flow controller being movable relative to said main piston and said pilot valve closing member.

2. A valve according to claim 1 wherein
said supply aperture comprises an opening cross section that is reducible by a control element.

3. A valve according to claim 1 wherein
an aperture slot is between said fluid inlet and said supply aperture.

4. A valve according to claim 3 wherein
said aperture slot comprises an annular gap between said valve housing and said main piston.

5. A valve according to claim 1 wherein
a spring is coupled to and biases said main piston into a closing position via said pilot valve closing member.

6. A valve according to claim 1 wherein
said pilot valve closing member is drawn away from a pilot valve seat by said actuator.

7. A valve, comprising:
a valve housing having a fluid inlet and a fluid outlet;
a main piston movable in said valve housing to adjust fluid flow between said fluid inlet and said fluid outlet;
a pilot valve chamber on a rear face of said main piston;
a pilot valve closing member being coupled to and actuated by an actuator and being movable in said valve housing to adjust fluid flow between said pilot valve chamber and said fluid outlet;
a supply aperture located between said fluid inlet and said pilot valve chamber; and
a maximum volumetric flow controller in said main piston in an outflow direction between said pilot valve chamber and said fluid outlet, said maximum volumetric flow controller including a control piston having a front face exposed to pressure of fluid flowing out of said pilot valve chamber and a rear face coupled to a spring.

8. A valve according to claim 7 wherein
a fluid channel is in said control piston; and
said maximum volumetric flow controller comprises control edges formed in said control piston and in said main piston by bores therein, a size of an opening cross section limited by said control edges being dependent on a position of said control piston.

9. A valve according to claim 8 wherein
said fluid channel comprises a lateral opening on said control piston.

10. A valve according to claim 7 wherein
said control piston is in an axial bore in said main piston.

11. A valve according to claim 10 wherein
an end cap holds said control piston in said axial bore.

12. A valve, comprising:
a valve housing having a fluid inlet and a fluid outlet;
a main piston movable in said valve housing to adjust fluid flow between said fluid inlet and said fluid outlet;
a pilot valve chamber on a rear face of said main piston;
a pilot valve closing member being coupled to and actuated by an actuator and being movable in said valve housing to adjust fluid flow between said pilot valve chamber and said fluid outlet;
a supply aperture located between said fluid inlet and said pilot valve chamber and including an opening cross section reducible by a control element, said control element being assigned to said pilot valve closing member; and
a maximum volumetric flow controller in said main piston in an outflow direction between said pilot valve chamber and said fluid outlet.

13. A valve according to claim 12 wherein
said control element comprises a radial projection on said pilot valve closing member.

14. A valve according to claim 13 wherein
said radial projection comprises a collar having at least one pressure-relief bore.

15. A valve, comprising:
a valve housing having a fluid inlet and a fluid outlet;
a main piston movable in said valve housing to adjust fluid flow between said fluid inlet and said fluid outlet;
a pilot valve chamber on a rear face of said main piston;
a pilot valve closing member being coupled to and actuated by an actuator and being movable in said valve housing to adjust fluid flow between said pilot valve chamber and said fluid outlet;
a supply aperture located between said fluid inlet and said pilot valve chamber, said supply aperture comprising a plurality of aperture bores, an opening cross section of at least one of said aperture bores being reducible by a control element; and
a maximum volumetric flow controller in said main piston in an outflow direction between said pilot valve chamber and said fluid outlet.

16. A valve according to claim 15 wherein
each of said aperture bores have a same diameter.

17. A valve according to claim 15 wherein
said aperture bores are in said main piston and are offset relative to one another at least one of axially or over a circumference of said main piston.

18. A valve according to claim 15 wherein
said control element is on said pilot valve closing member.

19. A valve according to claim 15 wherein
said control element comprises a radial projection on said pilot valve closing member.

20. A valve according to claim 19 wherein
said radial projection comprises a collar having at least one pressure-relief bore.

21. A valve, comprising:
a valve housing having a fluid inlet and a fluid outlet;
a main piston movable in said valve housing to adjust fluid flow between said fluid inlet and said fluid outlet;
a pilot valve chamber on a rear face of said main piston;
a pilot valve closing member being coupled to and actuated by an actuator and being movable in said valve housing to adjust fluid flow between said pilot valve chamber and said fluid outlet, said pilot valve closing member being engagable with and relatively movable relative to a pilot valve seat in said main piston;
a supply aperture located between said fluid inlet and said pilot valve chamber; and
a maximum volumetric flow controller providing fluid communication in an outflow direction between said pilot valve chamber and said fluid outlet, said maximum volumetric flow controller regulating a maximum flow from said pilot valve chamber to said fluid outlet, said maximum volumetric flow controller being downstream of, separate from and spaced from said pilot valve seat and said pilot valve closing member.

* * * * *